United States Patent [19]
Angell

[11] Patent Number: 5,905,539
[45] Date of Patent: May 18, 1999

[54] METHOD AND APPARATUS FOR GENERATING A WIPE SOLID

[75] Inventor: R. Barry Angell, Nevada City, Calif.

[73] Assignee: Tektronix, Inc., Wilsonville, Oreg.

[21] Appl. No.: 08/065,786

[22] Filed: May 24, 1993

Related U.S. Application Data

[63] Continuation of application No. 07/586,642, Sep. 24, 1990, abandoned.

[51] Int. Cl.$^6$ ........................................... H04N 5/53
[52] U.S. Cl. ................................. 348/594; 345/508
[58] Field of Search ........................... 395/162, 164–166; 340/798–799; 358/21 R, 22, 160, 183; 348/578, 594, 595, 593; 345/501, 507–509

[56] References Cited

U.S. PATENT DOCUMENTS

| | | | |
|---|---|---|---|
| 4,805,022 | 2/1989 | Abt | 358/183 |
| 4,823,183 | 4/1989 | Jackson et al. | 358/183 |
| 4,855,834 | 8/1989 | Cawley et al. | 358/183 |
| 4,868,656 | 9/1989 | Geiger et al. | 358/160 |
| 4,930,014 | 5/1990 | Maeda et al. | 358/183 |
| 4,954,898 | 9/1990 | Nakata | 358/183 |
| 5,051,828 | 9/1991 | Chaplin | 358/183 |

*Primary Examiner*—Kee M. Tung
*Attorney, Agent, or Firm*—Francis I. Gray

[57] ABSTRACT

A wipe solid generator has a first memory with one memory location for each pixel during the active interval of a line of a video signal and a second memory with one memory location for each active line during a field of a video signal. A processor calculates numerical values, loads numerical values into the first and second memories, and reads numerical values from the first and second memories synchronously with a video signal. An arithmetic section carries out a combinational arithmetic operation on numerical values read from the memories and provides an output wipe solid signal dependent on the result of the operation.

17 Claims, 4 Drawing Sheets

METHOD AND APPARATUS FOR GENERATING A WIPE SOLID

This is continuation of application Ser. No. 07/586,642 filed Sep. 24, 1990 and now abandoned.

BACKGROUND OF THE INVENTION

This invention relates to a method and apparatus for generating a wipe solid.

Referring to FIG. 1 of the accompanying drawings, a wipe generator is used in conjunction with a video mixer 2, which receives two synchronized input video signals VideoA and VideoB, to provide a control signal such that the output video signal VideoC of mixer 2 contains a transition from VideoA to VideoB.

A conventional wipe generator has three main functional components, namely a function generator section 4, an arithmetic section 6 and a comparator section 10. The function generator section comprises a horizontal function generator 14H and a vertical function generator 14V, which generate predetermined functions synchronously with the horizontal and vertical sync signals respectively of the two synchronized input video signals. The functions that are generated by the function generators depend on the nature of the wipe that is desired.

The arithmetic section carries out mathematical operations on the functions provided by the function generators. The arithmetic section has a horizontal channel 16H and a vertical channel 16V. Each channel 16 includes an offset unit 18 for offsetting the function provided by the corresponding function generator 14, by adding a constant (negative, zero or positive) to the function, a scale unit 20 for scaling the function, by multiplying by a constant (greater than, less than, or equal to unity), an absolute value unit 22 for providing at the output the absolute value of the function received at the input, and a squaring unit 24. Since these functions of offsetting, scaling, forming the absolute value and forming the square are performed in the horizontal and vertical channels, they are performed separately on the output signals provided by the horizontal and vertical function generators 14H and 14V respectively.

The outputs of the scale unit 20H, absolute value unit 22H and square unit 24H are connected to a switch 28H for selecting the output of one of these units. Switch 28H is connected to a further switch 32H for applying the selected function signal to either a non-additive mixer 36 or a summation circuit 40. Switches 28V and 32V are similarly connected between, on the one hand, scale unit 20V, absolute value unit 22V and square unit 24V and, on the other hand, non-additive mixer 36 and summation circuit 40. A switch 46 is able to select the output of summation circuit 40, the output of mixer 36 or the output of a square root circuit 42, whose input is connected to the output of summation circuit 40. The function signal provided by switch 46 is the output signal of arithmetic section 6, and is known as a wipe solid.

The comparator section receives the wipe solid from the arithmetic section and also receives a signal whose value depends on the position of a lever arm 50 or other manual control member. These two input signals are applied to a comparator 54, in which a clip level is subtracted from the wipe solid level and the resulting difference signal is multiplied by a gain factor. The output signal of comparator 54 is level shifted at 56 and limited at 60 to provide a mix control signal which is applied to the control port of mixer 2.

As the lever arm is swung through its range of movement from one extreme to the other, the output signal VideoC of the mixer changes from VideoA to VideoB. When the lever arm is at an intermediate position, the VideoC field is divided spatially between VideoA and VideoB. The wipe solid determines the configuration of the transition in the VideoC field between VideoA and VideoB. For example, the wipe solid might be a cone, in which case the transition between VideoA and VideoB is a circle, and the size of the circle depends on the position of the lever arm.

The conventional wipe generator is subject to the disadvantage that the function generators are special purpose, and therefore multiple function generators are needed in order to achieve a wide variety of wipes. Further, the arithmetic unit must be able to perform a wide variety of mathematical operations on the functions. Although arithmetic section 6 shown in FIG. 1 includes eleven arithmetic units, there are numerous wipe solids that cannot be generated without additional circuitry.

Wipe solid generators of the general architecture shown in FIG. 1 have been implemented in both the analog domain and the digital domain.

SUMMARY OF THE INVENTION

In accordance with a first aspect of the invention, a wipe solid generator comprises a first memory having one memory location for each pixel during the active interval of a line of a video signal and a second memory having one memory location for each active line during a field of a video signal. A processor calculates numerical values, loads numerical values into the first and second memories, and reads numerical values from the first and second memories synchronously with a video signal. An arithmetic section carries out a combinational arithmetic operation on numerical values read from the memories and provides an output signal dependent on the result of the operation.

In accordance with a second aspect of the invention, a wipe solid is generated by calculating numerical values, loading numerical values into a first memory having one memory location for each pixel during the active interval of a line of a video signal, loading numerical values into a second memory having one memory location for each active line during a field of a video signal, reading numerical values from the first and second memories synchronously with a video signal, and carrying out a combinational arithmetic operation on the numerical values read from the memories and providing an output signal dependent on the result of the operation.

BRIEF DESCRIPTION OF THE DRAWINGS

For a better understanding of the invention, and to show how the same may be carried into effect, reference will now be made, by way of example, to the remaining figures of the accompanying drawings in which.

DETAILED DESCRIPTION

Figure 2:
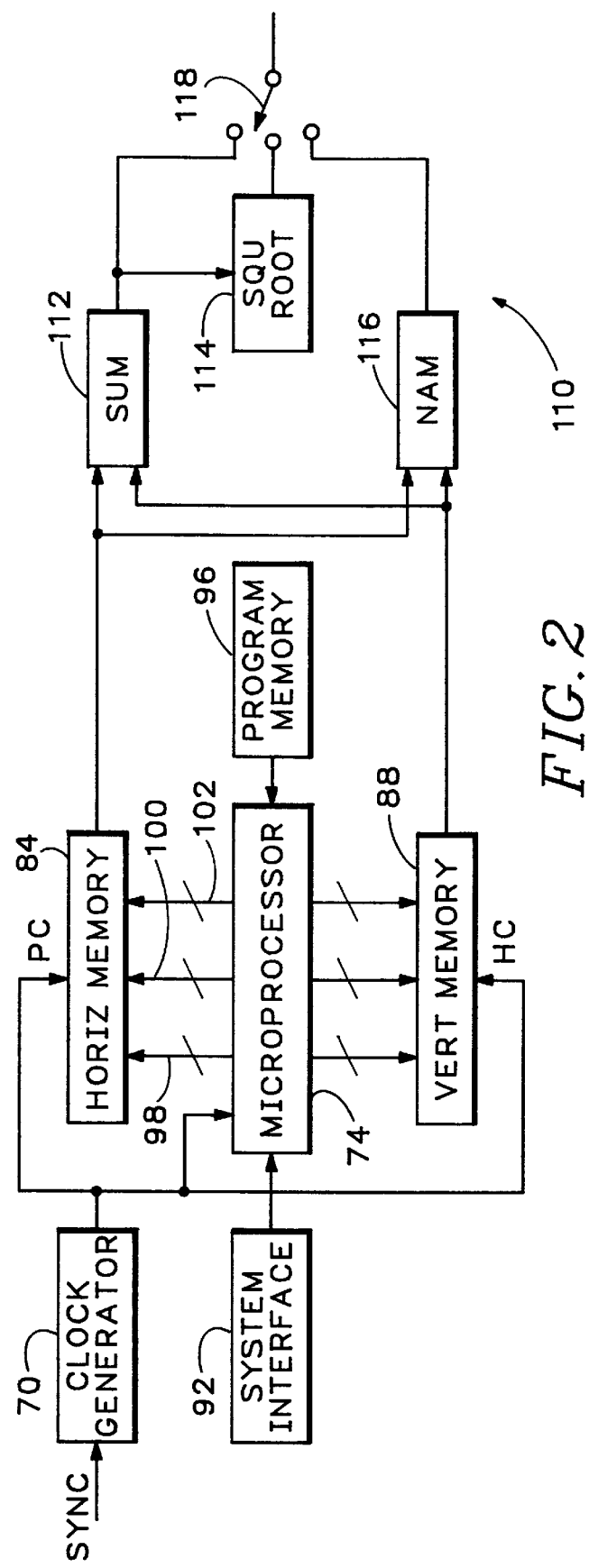
FIG. 2 is a block diagram of a first wipe solid generator embodying the present invention.

The wipe solid generator illustrated in FIG. 2 comprises a clock generator 70 which receives horizontal and vertical sync signals synchronized with the video signals that are to be combined under control of the wipe solid generated by the circuit shown in FIG. 2. Clock generator 70 generates a vertical clock VC, which occurs once during each field, a horizontal clock HC which occurs at the beginning of each line of the raster, and a pixel clock PC at a frequency of about 14.32 MHz, so that 910 pixel clocks occur during each horizontal line. Clock signals VC, HC and PC are applied to a high power microprocessor 74, such as a processor of the TMS320 family, which counts the number of horizontal clocks that have occurred since the preceding vertical clock and counts the number of pixel clocks that have occurred since the last horizontal clock, and thus is able to keep track of the location in the field.

The wipe solid generator further comprises horizontal and vertical shift register memories 84, 88. Memory 84 has 760 memory locations (one for each pixel in the active line time of the NTSC signal) and memory 88 has 483 locations (one for each active line in the NTSC frame).

A system interface 92 provides a signal to microprocessor 74 indicating the nature of a wipe that is desired. In response to this signal, microprocessor 74 selects a program stored in a program memory 96 and uses that program to calculate 16-bit numerical values for loading into memories 84, 88. For example, for a simple horizontal wipe, the selected program causes microprocessor 74 to calculate $$Hi=(i+PositionH)*AspectH \qquad (1)$$

for i=1 . . . 760, where PositionH is a horizontal offset and AspectH is a scaling factor with respect to the horizontal direction. The values of PositionH and AspectH are received from the system interface. By use of control lines 98, including a read enable line and a write enable line, and address lines 100 and data lines 102, microprocessor 74 loads the value Hi into the ith location of memory 84 during the vertical blanking interval of the video signal. Similarly, for a simple vertical wipe, the program stored in memory 96 causes microprocessor 92 to calculate $$Vj=(j+PositionV)*Aspectv \qquad (2)$$

for j=1 . . . 483, where PositionV is a vertical offset and AspectV is a scaling factor with respect to the vertical direction, and microprocessor 92 loads the value Vj into the jth location of memory 88 during the vertical blanking interval.

A constant is loaded into all locations of memory 88 for a simple horizontal wipe and a constant is loaded into all locations of memory 84 for a simple vertical wipe.

For a horizontally closed pattern (a pattern in which there are two segments of either VideoA or VideoB on an active line of the field) having linear boundaries, the values are $$Hi=|(i+PositionH)|*AspectH \qquad (3)$$

where $|(x)|$ represents the absolute value of x, and for a vertically closed pattern having linear boundaries the values are $$Vj=|(j+PositionV)|*AspectV \qquad (4)$$

The values indicated in equations (3) and (4) can be used to generate a rectangular wipe pattern.

For a circle pattern, the values loaded into memories 84 and 88 are $$Hi=(|(i+PositionH)|*AspectH)**2 \qquad (5)$$

$$Vj=(|(i+PositionV)|*AspectV)**2 \qquad (6)$$

where * * represents the exponentiation operator.

Pixel clock PC is applied to horizontal memory 84 and horizontal clock HC is applied to vertical memory 88. During the active interval of each field, microprocessor 74 applies a read enable signal to memories 84 and 88, allowing pixel clock PC and horizontal clock HC to shift the contents out of memories 84 and 88 respectively. Thus, at the beginning of line 83, for example, of the active interval, the numerical value stored in location 83 of memory 88 is shifted out, and during the active interval of line 83 the entire contents of memory 84 are shifted out in sequence.

Figure 1:
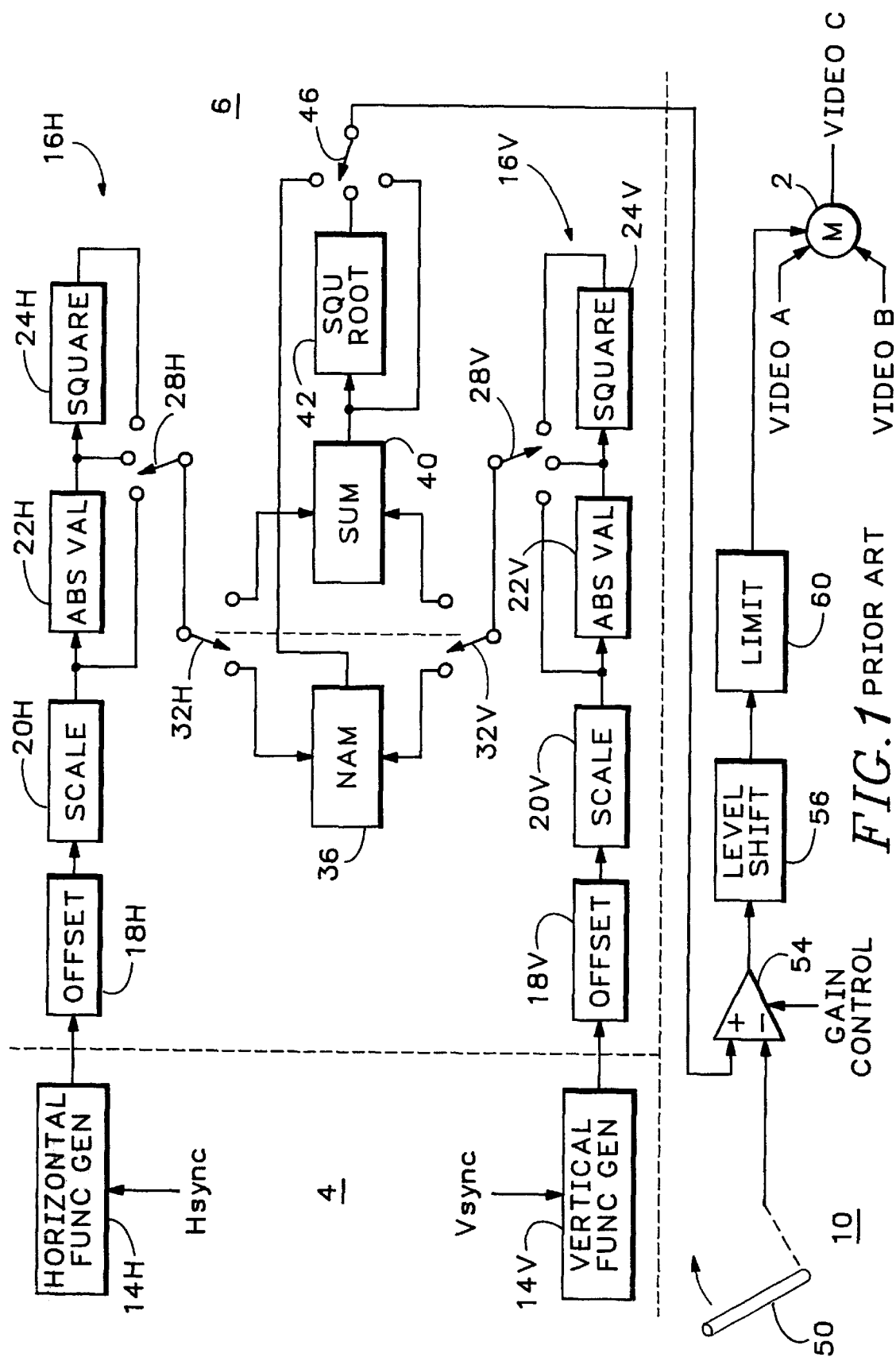
FIG. 1 is a block diagram of a conventional wipe generator.

The values read from memories 84 and 88 are applied to an arithmetic section 110 comprising an adder 112, a square root circuit 114, whose input is connected to the output of adder 104, and a non-additive mixer 116. A switch 118 is able to select the output of adder 112, the output of square root circuit 114 or the output of mixer 116. If switch 118 selects the output of adder 112, for pixel Pij (the ith pixel on line j of the active interval) it provides an output value Wij equal to the sum of the numerical values Hi and Vj. If switch 118 selects the output of non-additive mixer 116, Wij is equal to the greater or lesser of Hi and Vj, depending on the state of mixer 116. If switch 118 selects circuit 114, Wij is equal to the square root of the sum of Hi and Vj and if Hi and Vj are given by equations (5) and (6) respectively a circle wipe pattern is generated. In this manner, a digital wipe solid is generated. The digital wipe solid is applied to a comparator section (not shown), which is similar to the comparator section shown in FIG. 1.

Loading of the horizontal and vertical shift register memories can continue into the active interval of the video field. Of course, the horizontal memory must be loaded before the end of the first line of the active interval, and writing to the horizontal memory must stay ahead of reading from the horizontal memory during the first active line. Writing to the vertical memory can be accomplished on a line by line basis.

The microprocessor 74 is able to calculate a wide variety of functions, and therefore the function generator section is not limited to a particular function. It will be seen that the arithmetic unit of the wipe solid generator shown in FIG. 2 can be much less complex than that shown in FIG. 1, since the arithmetic unit only needs to be able to carry out combinational operations, i.e., operations that combine the horizontal and vertical functions, and does not need to operate on the horizontal and vertical functions separately. Any operations that are performed on the horizontal and vertical functions separately, such as the scaling, offsetting and squaring operations mentioned above, are performed by the microprocessor before the shift register memories are loaded.

Of course, the wipe solid generator described with reference to FIG. 2 is not limited to the patterns described above, since selection of an appropriate program from program memory 96 allows a wide range of other patterns to be generated. For example, the classes of wipes known as matrix, or digital, wipes and random wipes can be created using the same hardware as the wipes mentioned above.

Figure 3:
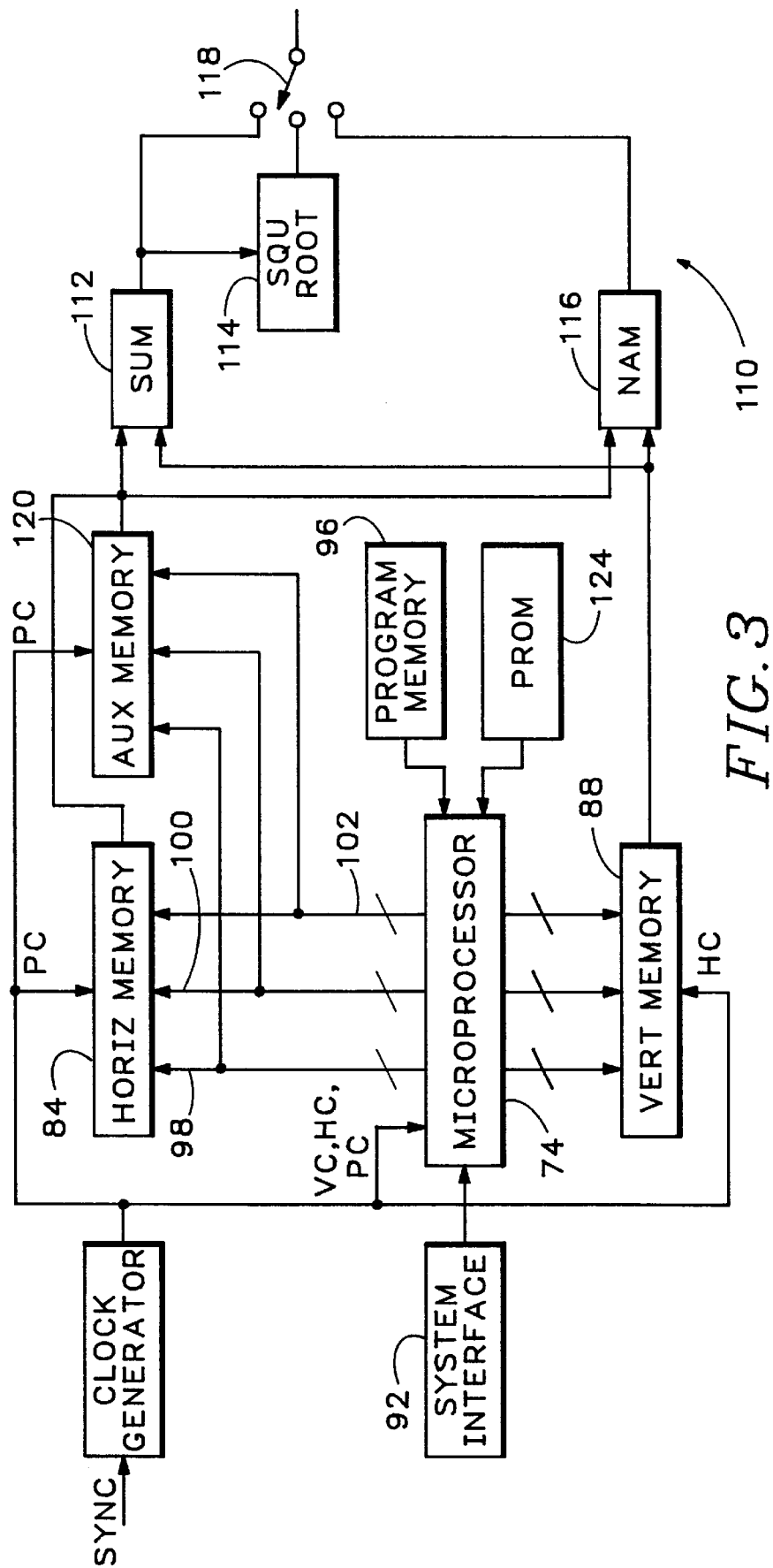
FIG. 3 is a block diagram of a second wipe solid generator embodying the present invention.

Referring now to FIG. 3, a second embodiment of the invention includes an auxiliary horizontal shift register memory 120 and control lines 98 include chip select lines. This auxiliary memory provides two advantages. First, it relieves some of the time constraints associated with loading memory 84 at field rate, since it allows microprocessor 74 to load one horizontal memory during a given field and to read from that memory during the active interval of the next field, i.e., to read from the memories in alternating fashion on a field by field basis. Alternatively, the two horizontal memories may be loaded at field rate with different sets of data and the microprocessor may switch between the memories within the active field interval, providing the possibility of more complex wipes. FIG. 3 also shows the possibility of employing a programmable read-only memory 124 to store the values to be loaded into the horizontal memory. The contents of PROM 124 are loaded into horizontal memory 84 during the vertical blanking interval. When PROM 124 is used, it is not necessary to employ auxiliary memory 120. Use of PROM 124 is appropriate for very complex wipe solids, such that the calculations cannot be completed during the vertical blanking interval.

Figure 4:
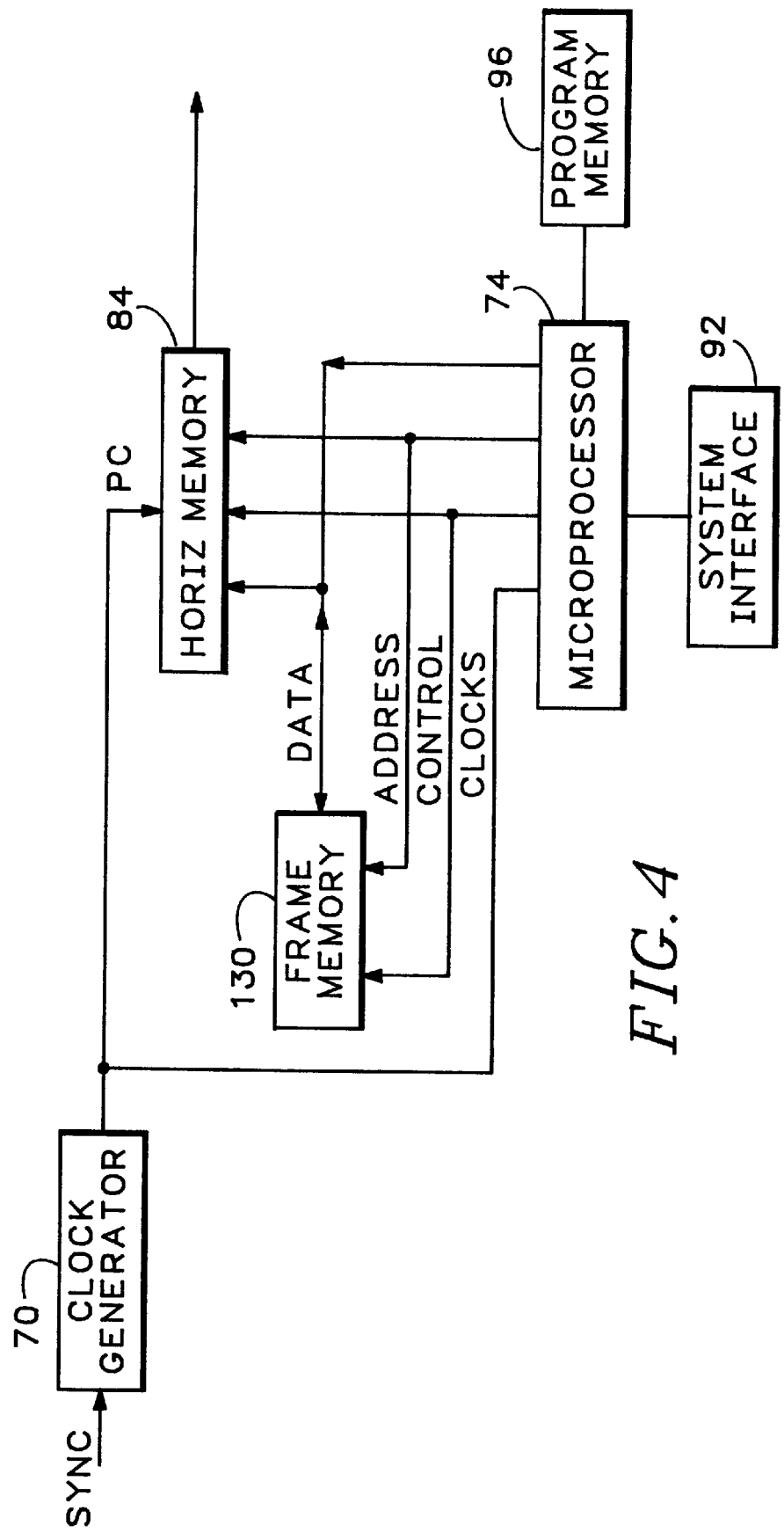
FIG. 4 is a block diagram of a third wipe solid generator embodying the present invention.

In a further modification, shown in FIG. 4, a memory 130 having a memory location for each displayable pixel of the video frame is loaded with numerical values that have been calculated in advance by microprocessor 74, and the values stored in the memory are transferred line by line to the horizontal memory during the interval in which a wipe is to be executed. This modification also allows creation and storage of data defining patterns that are too complex to calculate in a single field.

It will be appreciated that the invention is not restricted to the particular embodiments that have been described, and that variations may be made therein without departing from the scope of the invention as defined in the appended claims and equivalents thereof. For example, although the values of Hi and Vj do not change from field to field during a wipe, the ability to calculate values of Hi and Vj during the vertical blanking interval is provided in the system described with reference to FIG. 2 in order to accommodate a rapid sequence of wipes. However, if this feature is not required in a particular implementation, it is not necessary that the microprocessor be able to recalculate the values of Hi and Vj on a field by field basis. If the values are not calculated on a field by field basis, but are simply loaded at the beginning of the wipe, it may be possible to use a less powerful microprocessor.

I claim:

1. A wipe solid generator comprising:
   a first memory having one memory location for each pixel during the active interval of a line of a video signal,
   a second memory having one memory location for each active line during a field of a video signal,
   processor means for calculating numerical values, loading numerical values into the first and second memories, and reading numerical values from the first and second memories synchronously with a video signal, and
   arithmetic means for carrying out a combinational arithmetic operation on numerical values read from the memories and providing an output signal dependent on the result of the operation.

2. A wipe solid generator according to claim 1, wherein the arithmetic means comprise summation means for summing numerical values read from the first and second memories.

3. A wipe solid generator according to claim 2, wherein the arithmetic means comprise means for forming a square root of the output of the summation means.

4. A wipe solid generator according to claim 1, wherein the arithmetic means comprise means for non-additive mixing of a numerical value read from the first memory with a numerical value read from the second memory.

5. A wipe solid generator according to claim 1, comprising a third memory having one memory location for each pixel during the active interval of a line of a video signal, and wherein the processor means loads numerical values into the third memory.

6. A wipe solid generator according to claim 5, wherein the processor means are operative for reading numerical values from the first and third memories in alternating fashion on a field by field basis.

7. A wipe solid generator according to claim 1, wherein the processor means are programmed to calculate numerical values, Sk, in accordance with at least one of the following functions $$Sk=(k+Position)*Aspect$$

$$Sk=|(k+Position)|*Aspect$$

$$Sk=(|(k+Position)|*Aspect)**2$$

where k is an integer greater than zero and Aspect and Position are constants.

8. A wipe solid generator comprising:
   a first memory having one memory location for each pixel during an active interval of a line of a video signal,
   a second memory having one memory location for each displayable pixel in a frame of a video signal, and
   processor means for calculating numerical values, loading numerical values into the second memory, transferring numerical values from the second memory into the first memory on a line by line basis, and reading numerical values from the first memory synchronously with a video signal.

9. A wipe solid generator comprising:
   a read/write memory having one memory location for each pixel during active interval of a line of a video signal,
   a read-only memory having one memory location for each pixel during the active interval of at least one line of a video signal, and
   controller means for reading numerical values from the read-only memory, loading numerical values into the read/write memory, and reading numerical values from the read/write memory synchronously with a video signal.

10. A method of generating a wipe solid, comprising:
    (a) calculating numerical values,
    (b) loading numerical values into a first memory having one memory location for each pixel during the active interval of a line of a video signal,
    (c) loading numerical values into a second memory having one memory location for each active line during a field of a video signal,
    (d) reading numerical values from the first and second memories synchronously with a video signal, and
    (e) carrying out a combinational arithmetic operation on the numerical values read from the memories and providing an output signal dependent on the result of the operation.

11. A method according to claim 10, wherein step (c) comprises summing the numerical values read from the first and second memories.

12. A method according to claim 11, further comprising forming a square root of the sum of the values read from the first and second memories.

13. A method according to claim 10, wherein step (e) comprises non-additively mixing the numerical values read from the first and second memories.

14. A method according to claim 10, wherein step (a) comprises calculating numerical values, Sk, in accordance with at least one of the following functions:

$$S_k = (k + \text{Position}) * \text{Aspect}$$

$$S_k = |(k + \text{Position})| * \text{Aspect}$$

$$S_k = (|(k + \text{Position})| * \text{Aspect})**2$$

where k is an integer greater than zero and Aspect and Position are constants.

15. A method according to claim 14, wherein step (a) comprises calculating numerical values, Hi, in accordance with at least one of the following functions:

$$H_i = (i + \text{PositionH}) * \text{AspectH}$$

$$H_i = |(i + \text{PositionH})| * \text{AspectH}$$

$$H_i = (|(i + \text{PositionH})| * \text{AspectH})**2$$

where i is an integer ranging from one to the number of pixels during the active interval of a line of a video signal, and calculating numerical values, Vj, in accordance with at least one of the following functions:

$$V_j = (j + \text{PositionV}) * \text{AspectV}$$

$$V_j = |(j + \text{PositionV})| * \text{AspectV}$$

$$V_j = (|(j + \text{PositionV})| * \text{AspectV})**2$$

where j is an integer ranging from one to the number of active lines during a field of a video signal.

16. A method according to claim 15, comprising loading the value Hi into the ith memory location of the first memory and loading the value Vj into the jth memory location of the second memory.

17. A method of generating a wipe solid, comprising:

(a) calculating numerical values, (b) loading numerical values into a first memory having one memory location for each pixel during the active interval of a line of a video signal, a second memory having one memory location for each pixel during the active interval of a line of a video signal, and a third memory having one memory location for each active line during a field of a video signal, (c) during at least one line of a field of a video signal, reading the numerical values from the first memory synchronously with the video signal, reading a numerical value from the third memory, and carrying out a combinational arithmetic operation on the values read from the first memory and the value read from the third memory and providing an output signal dependent on the result of the operation, and (d) during a subsequent line of the video signal, reading the numerical values from the second memory synchronously with the video signal, reading a numerical value from the third memory, and carrying out a combinational arithmetic operation on the values read from the second memory and the value read from the third memory and providing an output signal dependent on the result of the operation.

\* \* \* \* \*